United States Patent
Furtenback et al.

(10) Patent No.: US 7,054,305 B2
(45) Date of Patent: May 30, 2006

(54) COMBINING NARROWBAND APPLICATIONS WITH BROADBAND TRANSPORT

(75) Inventors: Ros-Marie Furtenback, Johanneshov (SE); Magnus Hallenstål, Täby (SE); Jan Alvar Gjärdman, Farsta (SE); Tomas Nylander, Stavsnas (SE); Michael Ranjel, Delahey (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1083 days.

(21) Appl. No.: 09/866,135

(22) Filed: May 25, 2001

(65) Prior Publication Data

US 2002/0051443 A1 May 2, 2002

Related U.S. Application Data (63) Continuation of application No. 09/353,135, filed on Jul. 14, 1999.

(51) Int. Cl.
*H04L 12/28* (2006.01)
*H04J 3/12* (2006.01)

(52) U.S. Cl. .............. 370/352; 370/395.51; 370/466; 370/522; 379/220.01

(58) Field of Classification Search .............. 370/352, 370/353, 395.51, 466, 468, 522, 389, 392, 370/230, 236, 354, 395.1, 395.21, 401, 467; 379/220.1, 219, 230, 220.04, 220.01
See application file for complete search history.

(56) References Cited

U.S. PATENT DOCUMENTS

| | | | |
|---|---|---|---|
| 5,483,527 A * | 1/1996 | Doshi et al. ................. | 370/399 |
| 5,568,475 A * | 10/1996 | Doshi et al. ................. | 370/399 |
| 6,041,109 A | 3/2000 | Cardy et al. ................. | 379/201 |
| 6,128,295 A | 10/2000 | Larsson et al. .............. | 370/389 |
| 6,169,735 B1 * | 1/2001 | Allen et al. ................. | 370/352 |
| 6,381,246 B1 * | 4/2002 | Constantinof et al. ...... | 370/410 |
| 6,480,493 B1 * | 11/2002 | Christie et al. ........... | 370/395.2 |
| 2001/0017861 A1 * | 8/2001 | Allen et al. ................. | 370/399 |
| 2002/0017861 A1 * | 2/2002 | Davies et al. ............... | 313/578 |

FOREIGN PATENT DOCUMENTS

| WO | WO 98/28884 | * 7/1998 |
|---|---|---|
| WO | WO 99/13679 | 3/1999 |

* cited by examiner

*Primary Examiner*—Afsar Qureshi (57) ABSTRACT

ATM is used as a transport and switching mechanism in a hybrid STM/ATM network while the signaling remains normal narrowband signaling. The narrowband signaling is transported on permanent paths over ATM connections, and the narrowband speech channels are transported on ATM and switched on a "Per call basis" (on-demand) through an ATM switch. A translator formats a call-setup-related signaling message into ATM cells so that the signaling message can be routed through an ATM switch to a circuit switched (STM) node. The circuit switched node (PSTN/ISDN) sets up a physical connection for the call and generates a further signaling message therefor that relates to the physical connection. The ATM switch routes an ATM cell-formatted version of the further signaling message to another ATM switch over an ATM physical interface. Thus, the ATM switch switches both narrowband traffic and signaling for the call over the ATM physical interface.

15 Claims, 7 Drawing Sheets

COMBINING NARROWBAND APPLICATIONS WITH BROADBAND TRANSPORT

This Nonprovisional Application for Patent is a Continuation of U.S. Nonprovisional Application for patent Ser. No. 09/353,135, filed on Jul. 14, 1999.

BACKGROUND

1. Field of the Invention

The present invention pertains to narrowband telephony and data communications, and particularly to using a broadband transport for narrowband telephony and data communications.

2. Related Art and Other Considerations

The increasing interest for high band services such as multimedia applications, video on demand, video telephone, and teleconferencing has motivated development of the Broadband Integrated Service Digital Network (B-ISDN). B-ISDN is based on a technology know as Asynchronous Transfer Mode (ATM), and offers considerable extension of telecommunications capabilities.

ATM is a packet-oriented transfer mode which uses asynchronous time division multiplexing techniques. Packets are called cells and traditionally have a fixed size. A traditional ATM cell comprises 53 octets, five of which form a header and forty eight of which constitute a "payload" or information portion of the cell. The header of the ATM cell includes two quantities which are used to identify a connection in an ATM network over which the cell is to travel, particularly the VPI (Virtual Path Identifier) and VCI (Virtual Channel Identifier). In general, the virtual is a principal path defined between two switching nodes of the network; the virtual channel is one specific connection on the respective principal path.

At its termination points, an ATM network is connected to terminal equipment, e.g., ATM network users. Typically between ATM network termination points there are plural switching nodes, the switching nodes having ports which are connected together by physical transmission paths or links. Thus, in traveling from an originating terminal equipment to a destination terminal equipment, ATM cells forming a message may travel through several switching nodes.

A switching node has a plurality of ports, each of which can be connected by via a link circuit and a link to another node. The link circuit performs packaging of the cells according to the particular protocol in use on the link. A cell incoming to a switching node may enter the switching node at a first port and exit from a second port via a link circuit onto a link connected to another node. Each link can carry cells for plural connections, a connection being e.g., a transmission between a calling subscriber or party and a called subscriber or party.

The switching nodes each typically have several functional parts, a primary of which is a switch core. The switch core essentially functions like a cross-connect between ports of the switch. Paths internal to the switch core are selectively controlled so that particular ports of the switch are connected together to allow a message ultimately to travel from an ingress side of the switch to an egress side of the switch, and ultimately from the originating terminal equipment to the destination terminal equipment.

While ATM is envisioned as the transport mechanism for more advanced services such as Broadband ISDN (B-ISDN), it nevertheless must be recognized that the current narrow band networks (e.g., PSTN, ISDN) will remain (at least in part) for quite some time. It has taken decades for the present voice switched telephony networks (e.g., PSTN, ISDN) to reach their present advanced functionalities. While ATM networks are being built, the ATM networks likely will not easily acquire all the functionalities of advanced voice communication. Therefore, at least initially, ATM will in some instances be added to or replace parts of a circuit switched telephony network. In such instances ATM will be used for transport and switching.

U.S. Pat. Nos. 5,568,475 and 5,483,527 to Doshi et al. incorporate ATM switches for routing telephony voice signals between Synchronous Transfer Mode (STM) nodes. The ATM switches use a signaling system No. 7 (SS#7) network to establish a virtual connection, rather than a circuit switched connection (as would be the case in pure STN network). The signaling system No. 7 (SS#7) network of U.S. Pat. Nos. 5,568,475 and 5,483,527 includes signal transfer points (STPs) which are connected by special physical links to each of the ATM switch nodes. For call setup, for example, signaling messages are relayed through the non-ATM signaling system No. 7 network. In such relaying, a non-ATM STP receives the signaling message and advises its associated ATM node of the call setup. The associated ATM node then can identify idle resources to be used for forwarding voice signals to the next ATM node once the call has been setup, and prepares its own signaling message to be used in the relay. The signaling message prepared by the ATM node is returned to its associated STP, which forwards the signaling message via the signaling system No. 7 network to another STP associated with the next ATM node. Such relaying continues until the signaling message reaches a STP of a STM local exchange carrier-(LEC). Once the call has been set up, the ensuing speech (or voice-band data) is transported via the ATM nodes. STM/ATM terminal adapters are situated between the STM network and the ATM network for packing samples of voice signals as received from the STM network into ATM cells for application to the ATM network, and for unpacking ATM cell payloads to obtain voice signals for application to the STM network.

The incorporation of ATM into an STM network in the particular manner as descried above thus involves a non-ATM signaling network alongside the ATM nodes. What is needed therefore, and an object of the present invention, is a grafting of a network of ATM switches into an STM network in a manner whereby a separate physical signaling interface is not required for signaling purposes.

BRIEF SUMMARY OF THE INVENTION

ATM is used as a transport and switching mechanism in a hybrid STM/ATM network, while the signaling remains norm, al narrowband signaling. The narrowband signaling is transported on permanent paths over ATM connections, and the narrowband speech channels are transported on ATM and switched on a "per call basis" (on-demand) through an ATM switch.

The hybrid STM/ATM network has an access node which services narrowband terminals and which generates a signaling message in connection with call setup. A translator formats the first signaling message into ATM cells so that the first signaling message can be routed through an ATM switch to a circuit switched (STM) node. The circuit switched node (PSTN/ISDN) sets up a physical connection for the call and generates a further signaling message for the call, the further signaling message pertaining to the physical connection. The ATM switch routes an ATM cell-formatted version of the further signaling message to another ATM switch over an ATM physical interface. Thus, the ATM switch switches both narrow band traffic and signaling for the call over the ATM physical interface. The ATM physical interface thus carries ATM cell-formatted version of the further signaling message amidst ATM traffic cells.

In view of the fact that the circuit switched node and the ATM switch employ different parameters (e.g., b-channel, etc., for the STM node and VP/VC for the ATM switch), in one embodiment the STM nodes obtains global position numbers (GPN) for use in setting a path for the further signaling message through the ATM switch. In this regard, at the circuit switched node a translation is made from STM to GPN using a STM/GPN translation table; at the ATM node a translation is made from GPN to VP/VC/port using a GPN/ATM translation table.

The ATM cell-formatted version of the further signaling message is transported over the ATM physical link and ultimately reaches a destination access node which serves a destination terminal. A destination translator unpacks ATM cells carrying the ATM cell-formatted version of the further signaling message to obtain the STM signaling information for use by the destination access node.

Preferably, the translators are situated at the access node. In an illustrated embodiment, the ATM switches are situated at nodes distinct from the PSTN/ISDN nodes, but such need not be the case in other embodiments.

The signaling messages can be in accordance with signaling system no. 7 convention, and the further signaling message can be one of an ISUP and TUP message, for example.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc, in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
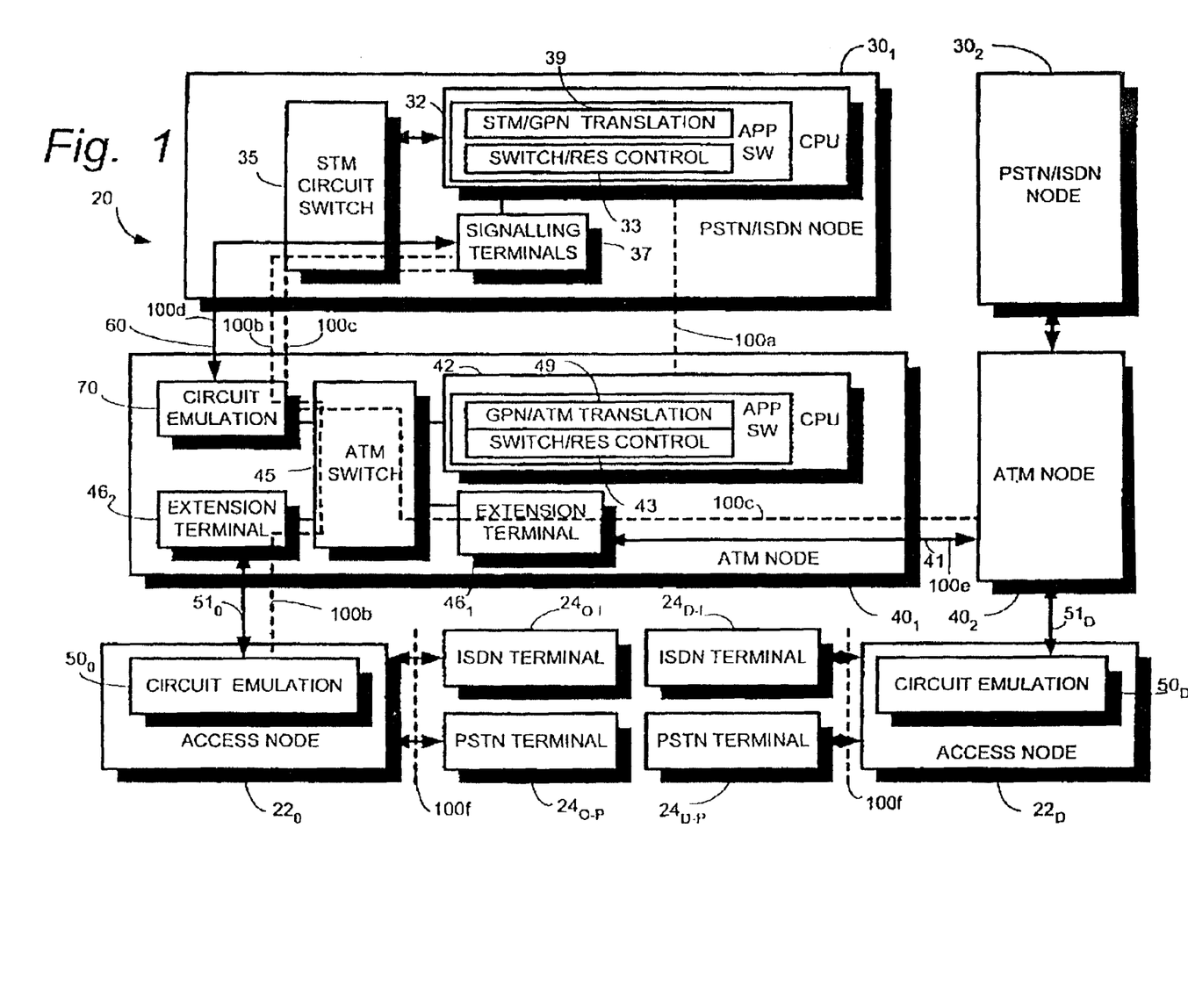
FIG. 1 is a schematic view of a hybrid STM/ATM network according to an embodiment of the invention.

FIG. 1 shows a hybrid STM/ATM network 20 according to an embodiment of the present invention. Narrow band terminal devices communicate with hybrid STM/ATM network 20 through access nodes, such as access node $22_O$ and access node $22_D$. For example, FIG. 1 shows terminals $24_O$ connected to access node $22_O$, particularly ISDN terminal $24_{O-I}$ and PSTN terminal $24_{O-P}$. Similarly, access node $22_D$ has access terminals $24_D$ connected thereto, namely ISDN terminal $24_{D-I}$ and PSTN terminal $24_{D-P}$. Of course, a differing (and most likely greater) number of terminals can be connected to each access node 22, but for simplicity only two such terminals are shown for example purposes in FIG. 1.

The hybrid STM/ATM network 20 of FIG. 1 comprises one or more STM nodes, also known as PSTN/ISDN nodes 30. While only two such PSTN/ISDN nodes $30_1$ and $30_2$ are shown in FIG. 1 for sake of illustration, it should be understood that the present invention is not limited to only two such nodes. The structure and operation of conventional PSTN/ISDN nodes 30 are well known; such as those typified by utilization of Ericsson AXE switches, for example. Therefore, only selected pertinent portions of conventional PSTN/ISDN nodes 30 are described herein with reference to PSTN/ISDN node $30_1$. For example, PSTN/ISDN node $30_1$ has processor(s) 32 which execute, e.g., node application software including switch and resource control software 33. Such software is used to control STM circuit switch 35 as well as signaling terminals 37 which comprise PSTN/ISDN node $30_1$. Other details of the structure and operation of a conventional PSTN/ISDN node are understood, for example, from U.S. patent application Ser. No. 08/601,964 for "Telecommunications Switching Exchange".

The STM/ATM network 20 of the present invention is considered a hybrid network in view of the fact that ATM nodes 40 are also included therein. As explained hereinafter, the ATM nodes 40 are used not only to route narrow band traffic between access nodes 22, but also for transport of signaling in ATM cells over an ATM physical interface. In the illustrated example, the ATM network aspect includes two example ATM nodes, particularly ATM node $40_1$ and ATM node $40_2$, which are connected by ATM physical interface or link 41. Again, it should be understood that the ATM component can (and typically does) comprise a greater number of ATM nodes, with the nodes being connected by ATM physical links.

In hybrid network 20, a PSTN/ISDN node 30 and a ATM node 40 can be paired together in the manner illustrated in FIG. 1. With such pair, the PSTN/ISDN node 30 and ATM node 40 are collectively referred to as hybrid node pair 30/40. The network 20 of the present invention thus can comprise any number of hybrid node pairs 30/40.

An ATM node such as ATM nodes 40 takes on differing configurations, but commonly has a main processor 42 or the like which executes application software including switch and resource control software as Generally depicted by 43 in FIG. 1. The heart of an ATM node is usually the ATM switch core or switch fabric, which for the illustrated embodiment is shown as ATM cell switch 45 in FIG. 1. Further information regarding an example ATM switch is provided by U.S. patent application Ser. No. 08/188,101, entitled "Asynchronous Transfer Mode Switch", filed Nov. 9, 1998, which is incorporated herein by reference. ATM cell switch 45 has plural ingress ports and plural egress ports, with at least some of such ports having a device board attached thereto.

Each device board at ATM node 40 can have one or more different functions performed thereby or one or more different devices mounted thereon. For example, one of the device boards attached to a port of ATM cell switch 45 can, in one embodiment, have the main processor 42 mounted thereon. Other device boards may have other processors, known as "board processors". Some device boards serve as extension terminals (ETs) 46 which are used to connected the ATM node to other nodes. For example, the ATM physical link 41 shown in FIG. 1 has a first end connected to an extension terminal ET $46_1$ of ATM node $40_1$, while a second end of ATM physical link 41 is connected to an unillustrated extension terminal ET of ATM node $40_2$. The device boards connected to ATM cell switch 45 of ATM node $40_1$ are not specifically illustrated in detail in FIG. 1, but the structure and operation of such device boards is understood with reference (for example) to the following United States Patent Applications, all of which are incorporated herein by reference: U.S. patent application Ser. No. 08/893,507 for "Augmentation of ATM Cell With Buffering Data", U.S. patent application Ser. No. 08/893,677 for "Buffering of Point-to-Point and/or Point-to-Multipoint ATM Cells"; U.S. patent application Ser. No. 08/893,479 for "VP/VC Look-Up Function"; U.S. patent application Ser. No. 09/188,097, entitled "Centralized Queuing For ATM Node", filed Nov. 9, 1998.

As explained hereinafter, signaling (e.g., for call setup) is routed from an access node 22 through an ATM node 40 to an appropriate one of the PSTN/ISDN nodes 30. Such being the case, a circuit emulation or translator 50 is provided for each access node 22 which communicates with an ATM node 40. The translators 50 serve, e.g., to encapsulate signaling information from the access node 22 into ATM cells for signaling directed toward an ATM node 40, and conversely unpack ATM payloads received from an ATM node 40 to extract signaling information for use by the access node 22. In the illustrated embodiment, the translators 50 are preferably provided at or proximate to their associated access nodes 22. That is, translator $50_O$ is situated at or included in access node $22_O$; translator $50_D$ is situated at or included in access node $22_D$. A pair of physical links, shown as links 51, are provided for connecting each access node 22 to a corresponding one of the ATM nodes 40.

ATM node 40 is connected to a PSTN/ISDN node 30 by a physical link 60. With reference to ATM node $40_1$, for example, a pair of switch-to-switch links 60 is employed to connect ATM cell switch 45 (through its circuit emulation board 70) to STM circuit switch 35 of PSTN/ISDN node $30_1$ for the carrying of signaling messages. One of the links in pair 60 carries messages from ATM cell switch 45 (after translation at circuit emulation board 70) to STM circuit switch 35, the other of the pair carries messages in the reverse direction.

In the illustrated embodiment, a dedicated VPI, VCI internal to ATM cell switch 45 is used for signaling. Thus, with reference to ATM node $40_1$, for example, link $51_O$ is connected to extension terminal (ET) $46_1$, which in turn is connected to a first pair of dedicated ports of ATM cell switch 45. Signaling messages received at ATM node $40_1$ which are destined to PSTN/ISDN node $30_1$ are routed on the dedicated internal VPI/VCI to a port of ATM cell switch 45 which ultimately connects (via circuit emulator 70) to switch-to-switch links 60. However, since the signaling routed through ATM cell switch 45 is encapsulated in ATM cells, a translation to the STM signaling must be performed prior to transmitting the signaling information on switch-to-switch links 60. For this reason, a device board connected to switch-to-switch links 60 has the circuit emulation (CE) or translator 70 mounted thereon.

The circuit emulation (CE) or translator 70 serves to unpack signaling information which is destined to PSTN/ISDN node $30_1$, but contained in ATM cells, so that the signaling information can be extracted from the ATM cells prior to application on switch-to-switch links 60. Conversely, signaling information received from PSTN/ISDN node $30_1$ on switch-to-switch links 60 at translator 70 is encapsulated into ATM cells for routing through ATM node $40_1$.

From FIG. 1 it can also be seen that a plurality of interfaces 100a–100f are utilized in the hybrid STM/ATM network 20 of the present invention. These interfaces are described below, primarily with reference to the exemplary nodes, e.g., PSTN/ISDN node $30_1$ and ATM node $40_1$.

Interface 100a is a logical interface which exists between processor(s) 32 of PSTN/ISDN node $30_1$ and main processor(s) 42 of ATM node $40_1$. Interface 100a enables PSTN/ISDN node 30 to control the ATM node 40 connected thereto. That is, with the signaling carried by interface 100a, PSTN/ISDN node $30_1$ can order physical connections which are to be set up in ATM node $40_1$. Interface 100a can be a proprietary interface or an open interface (such as a General Switch Management Protocol [GSMP] interface [see Request For Comments (RFC) 1987]). Logical interface 100a can be carried on any physical interface, such as interface 102e described below. Alternatively, interface 100a can be carried by a separate link (e.g., between processors 32 and 42), or carried on top of IP/Ethernet links.

Interface 100b is the signaling between the PSTN/ISDN nodes 30 and the access node 22 connected thereto. Interface 100b is carried on one or more semipermanent connections through the STM circuit switch 35; through the interworking unit with circuit emulation 70 into ATM cell switch 45; and over permanent virtual connections to access node 22 (particularly to translator 50 in access node 22, where it is emulated back and terminated). As mentioned above, translator 50 is employed to encapsulate the narrow band signaling from an access node 22 in ATM cells for use by an ATM node 40, and conversely for unpacking ATM cells with signaling information for use by an access node 22, Each STM channel on the user side has a corresponding VPI/VCI on interface 100b.

Interface 100c is the non-broadband signaling that is carried through and between the nodes. Interface 100c thus carries the normal signaling system No. 7 interface (TUP or ISUP) which is transparently carried in ATM cell-formatted versions of signaling messages over ATM physical link 41. In PSTN/ISDN node 30, the signaling terminals 37 are used for common channel signaling. In at least one embodiment, signaling terminals 37 can be pooled devices situated at STM circuit switch 35. Alternatively, the signaling terminals 37 can be connected directly to the interfaces between the STM and ATM switches.

Interface 100d is the physical interface provided by switch-to-switch link 60. Interface 100d can be used to carry speech for a call to and from an STM network, and also to carry the signaling of interface 100b and interface 100c as described herein. In addition, interface 100d can also be used to link in special equipment that is to be connected to a normal circuit switch, e.g., conference equipment, answering machines, and the like. Interface 100d can be realized by any standard physical. media, such as E1, for example, it being understood that STM-1 or similar speeds may be may suitable. The physical interface 100d can also carry the voice data for a conversation between any of the terminals shown in FIG. 1 and an unillustrated terminal connected to the circuit switched network, in which situation the hybrid node pair 30/40 acts as a gateway.

Interface 100e is the ATM physical link 41 to other ATM nodes. Any standard link for ATM may be employed for interface 100e. A dedicated VP/VC is employed to transparently transfer the signaling system no. 7 signaling between PSTN/ISDN nodes 30 over interface 100e.

Interface 100f, shown in FIG. 1 as connecting each access node 22 with its terminals, is a typical user-network interface (ISDN, BA/BRA, PRA/PRI, two wire PSTN, or other).

For two traditional circuit switched PSTN/ISDN nodes to communicate with one another using protocols such as ISUP or TUP, it is required that ISUP entities in both PSTN/ISDN nodes have coordinated data tables. In this regard, each of the two PSTN/ISDN nodes must have a table which translates a CIC value onto a same timeslot in a same physical interface connecting the two PSTN/ISDN nodes. Thus, a CIC value (together with a point code) represents a particular timeslot on a particular physical link. One specific CIC must, in the tables of both PSTN/ISDN nodes, point out exactly the same timeslot. In other words, the data tables of the two PSTN/ISDN nodes must be coordinated.

The need to coordinate the data tables of PSTN/ISDN node $30_1$ and PSTN/ISDN node $30_2$ for ISUP/TUP similarly exists in the present invention. If two hybrid nodes $30_1/40_1$ and $30_2/40_2$ have a communication channel set up between them, by means of a semipermanent connection carrying SS7 signaling, the translation tables 39 in both hybrid nodes must be coordinated from the standpoint of using CIC. This typically means that in both hybrid nodes $30_1/40_1$ and $30_2/40_2$ a certain CIC must point at the same VP and VC (and possibly AAL2 pointer) identifying cells on a certain physical link (e.g., link 41) connecting the two hybrid nodes. (Alternatively, the same objective can be accomplished by other suitable means such as a cross-connected ATM switch positioned between the hybrid nodes which switches packets and gives the packets the VP and VC value understood by the other node).

Figure 1A:
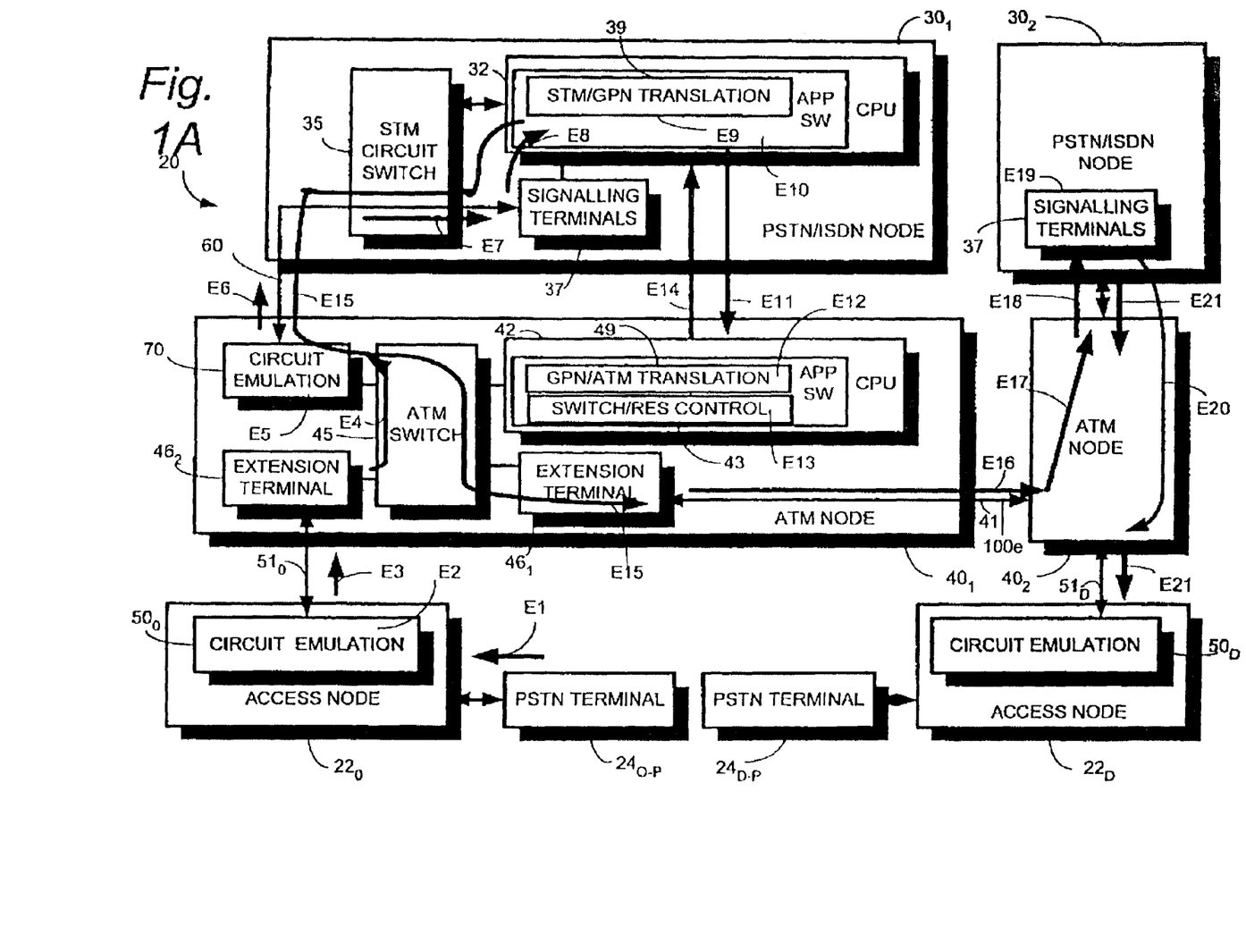
FIG. 1A is a schematic view of selected portions of the hybrid STM/ATM network of FIG. 1, and further showing various operational events.

FIG. 1A shows selected structure of hybrid STN/ATM network 20, having omitted therefrom various items including the interfaces. FIG. 1A also provides an example of signal processing for a call originating at terminal $24_{O\text{-}P}$ for which the called party number (destination) is terminal $24_{D\text{-}P}$. As shown by the arrow labeled E-1, as event E-1 a SETUP message is sent from terminal $24_{O\text{-}P}$ to access node $22_O$. In the illustrated embodiment, the SETUP message is an IAM message for an ISUP network interface, and is for a 30B+D PRA and for VS.x carried on a 64 kbs bitstream in a circuit switched timeslot.

At the translator $50_O$ associated with access node $22_O$, as event E-2 the signaling from terminal $24_{O\text{-}P}$ is converted from STM to ATM by packing the signaling information into ATM cell(s). In this regard, after the circuit emulation a table is employed to translate from a 64 kbps speech channel from terminal $24_{O\text{-}P}$ to a corresponding ATM address (VP/VC).

The signaling of the SETUP message, now encapsulated in ATM cell(s), is applied to link $51_O$ and transmitted to ATM cell switch 45 of ATM node $40_1$ as indicated by event E-3. As further indicated by event E-4, the ATM cell(s) containing the SETUP message signaling is routed through the ATM cell switch 45 in accordance with a switch internal VP/VC dedicated for STM-originated signaling. Upon egress from ATM cell switch 45, the signaling information for the SETUP message is retrieved from the ATM cell(s) by translator 70 [event E-5], and is reconverted at translator 70 from ATM to STM format, so that the SETUP message signaling information can be applied in STM format as event E-6 to switch-to-switch link 60.

The SETUP message, now again in STM format, is routed through STM circuit switch 35 (as indicated by event E-7) to an appropriate one of the signaling terminals 37. Upon receipt of the SETUP message signaling information at the appropriate signaling terminal 37, the signaling information is forwarded to processor(s) 32 of PSTN/ISDN node $30_1$ which engage in STM traffic handling (as indicated by event E-8).

In its traffic handling, the processor 32 of PSTN/ISDN node $30_1$ realizes that the incoming side of the call and the outgoing side of the call have physical connections through an ATM node. In this regard, when the access points of the connection were defined (subscriber or network interface), a bearer type was associated with the connection and stored in application software. In the present scenario, when the SETUP message (e.g., an IAM message in the case of an ISUP network interface) was received at PSTN/ISDN node 30, the stored bearer type data was checked in order to determine what switch was on the incoming side to PSTN/ISDN node 30. Further, the bearer type data stored for the outgoing point (based on B-Subscriber number) is similarly checked, and if the stored data indicates that both incoming and outgoing sides have an ATM bearer, the PSTN/ISDN node 30 can conclude that ATM node 40 is to be operated (e.g., utilized). In addition, data received in the SETUP message (particularly the B-subscriber number) is analyzed to determine that the called party (destination) terminal $24_{D\text{-}P}$ can be reached by contacting PSTN/ISDN node $30_2$. The PSTN/ISDN node $30_1$ realizes that it has a SS7 signaling interface 100c to PSTN/ISDN node $30_2$, and therefore selects a free CIC (e.g., a CIC not used by any other call) for use toward PSTN/ISDN node $30_2$.

If, on the other hand, the stored bearer type data had indicated an STM bearer, both PSTN/ISDN node 30 and ATM node 40 have to be operated. Thus, PSTN/ISDN node 30 and ATM node 40 collectively function as a gateway between the STM and ATM worlds.

Upon realizing that further signaling for the call will be routed through ATM nodes, in the embodiment of the invention shown in FIG. 1 and FIG. 1A the PSTN/ISDN node $30_1$ makes reference to a STM/GPN translation table 39 maintained by processor(s) 32 (see event E-9). Two translations are performed using STM/GPN translation table 39. As a first translation, the incoming information (b-channel and access information in the case of ISDN or CIC plus signaling system #7 point codes in the case of PSTN) contained in the SETUP message is translated to a global position number (GPN). As a second translation, the CIC and destination point code for a circuit leading to hybrid node pair 30/40 is translated to another global position number (GPN).

In connection with the foregoing, the global position number (GPN) is a common way to identify the connection points, and as such is understood by the pair of nodes (PSTN/ISDN node 30 and ATM node 40). In other words, the GPN is an address, or reference, or system internal pointer known by both PSTN/ISDN node 30 and ATM node 40, and used to translate between port/VP/VC and circuit switch address. Usage of GPN in the embodiment of FIG. 1 and FIG. 1A thereby obviates the sending of real addresses between PSTN/ISDN node 30 and ATM node 40. Advantageously, GPN can be shorter, meaning that there is less data to send. For traditional PTSN, the GPN would uniquely correspond to the 64 kbit voice on a two wire line, but for IDSN would correspond to a b-channel (which could be used by several subscribers).

Then, as event E-10, the PSTN/ISDN node 30 generates an ATM switch control message intended to setup a physical connection in ATM node 40. This message of event E-10 contains the two global position numbers (GPNs) obtained from STM/GPN translation table 39 at event E-9, together with an order for ATM node 40 to connect the two GPN addresses in ATM switch fabric 45. The PSTN/ISDN node 30 sends the switch control message generated at event E-10 to processor 42 of ATM node 40 over interface 100a, as shown by event E-11.

Upon reception of the switch control message sent as event E-11 to ATM node $40_1$, as indicated by event E-12 main processor 42 consults GPN/ATM translation table 49 in order to translate the two global position numbers (GPNs) contained in the event E-10 switch control message into VP/VC/port information understood by ATM node $40_1$. That is, the two global position numbers (GPNs) are used to obtain VP/VC/port information for ultimately reaching both the origination terminal ($24_{O-P}$) and the destination terminal ($24_{D-P}$). Upon successful translation of GPN to ATM, and assuming sufficient resources, processor 42 of ATM node $40_1$ sets up a path through ATM switch 45 and reserves resources on the port (trunk or link 41) for the call from terminal $24_{O-P}$ to terminal $24_{D-P}$. The path set up and resource reservation activities are accomplished using switch/reservation control 43, and are collectively illustrated as event E-13 in FIG. 1.

Since PSTN/ISDN node $30_1$ must know whether ATM node $40_1$ was successful in performing a GPN/ATM translation, a successful translation message is sent over interface 100a as event E-14 from ATM node $40_1$ to PSTN/ISDN node $30_1$. If the GPN/ATM translation is not successful at ATM node $40_1$, or if there are no available resources at ATM node $40_1$, a call rejection message is sent back to the originating terminal.

After PSTN/ISDN node 30 receives the confirmatory message of event E-14 (that ATM switch 45 has been setup and link reservations made [in accordance with event E-13]), as event E-15 the PSTN/ISDN node $30_1$ prepares and sends its further signaling message (e.g., ISUP or TUP) toward the PSTN/ISDN node at the other end, e.g., PSTN/ISDN node $30_2$. This filer signaling message is shown as event E-15 in FIG. 1A. The signaling of event E-15 (e.g., an ISUP or TUP message) includes a message transfer part (MTP), and can be sent out on a timeslot (e.g., 64 kbps) which carries the SS7 signaling.

As the signaling of event E-15 arrives at ATM node 40, the ATM node 40 prepares its ATM cell-formatted version of the signaling. In particular, the translator 70 puts the signaling information of the signaling of event E-15 into the payload of one or more ATM cells. For example, the translator 70 is configured to take the 64 kbps signaling information bitstream, and pack it into ATM cells with a predefined VP, VC and to a physical port. As also indicated as event E-15, the ATM cell-formatted version of the further signaling message is routed through ATM cell switch 45 and onto a link indicated by the VP/VC/port information obtained from the translation. In particular, in FIG. 1 the ATM cell-formatted version of the further signaling message is transported on ATM physical link 41, as shown by event E-16.

Upon reaching ATM node $40_2$, the ATM cell-formatted version of the further signaling messages obtains a new internal VPI/VCI for the ATM cell switch 45 of ATM node $40_2$, and is routed (as indicated by event E-17) through ATM cell switch 45 of ATM node $40_2$ to a circuit emulator in ATM node 402 which is analogous to circuit emulator $70_1$ in ATM node $40_1$. The circuit emulator of ATM node $40_2$ performs the conversion from ATM to STM format in like manner as circuit emulator $70_1$ in ATM node $40_1$, and then passes the signaling message to PSTN/ISDN node $30_2$ as event E-18.

In PSTN/ISDN node $30_2$ the ISUP message is received together with the CIC value (from the message transfer part [MTP]) and the B-Subscriber number (which is included in the ISUP message). As indicated by Event E-19, the second hybrid node $30_2/40_2$ also performs an analysis of the B-Subscriber number and concludes that the B-Subscriber number is associated with terminal $24_{D-P}$, which involves B channels. The PSTN/ISDN node $30_2$ then selects a B-channel which can be used to reach terminal $24_{D-P}$, or negotiates with the terminal $24_{D-P}$ as to which B-channel to use (depending on the terminal type and protocol type ISDN or PSTN). The PSTN/ISDN node $30_2$ also signals terminal $24_{D-P}$ to activate a ringing signal (as indicated by Event E-20). When an answer is received from terminal $24_{D-P}$ (or before), the PSTN/ISDN node $30_2$ consults its STM/GPN translation table $39_2$ using a CIC value and a B-channel, and then operates the ATM switch $45_2$ of ATM node $40_2$ in the same manner as occurred in ATM node $40_1$, as depicted by Event E-21.

Operation of ATM switch $45_2$ of ATM node $40_2$ allows in-band data (voice data) carried in ATM packets to be passed through the ATM switch. Such operation is accomplished in like manner as described previously, e.g., by consulting a table such as table 39, sending an ATM switch control message, consulting a table such as table 49, and setting up of a path in the ATM switch.

When an ATM switch is operated as described above, the resulting path through both ATM switches (carrying in-band information) has to be set up in the same way at both ends. This means that encapsulation of in-band information (which is controlled by circuit emulation (e.g., circuit emulation 70) at the two end points of the path, must be set up in the same way. Preferably, to minimize delay, AAL2 is utilized by circuit emulation 70 for the encapsulation, although other types of protocols are also possible.

It was mentioned above that a bearer type was associated with a connection and stored in the application software of the PSTN/ISDN node 30. It is presumed that the PSTN/ISDN node 30 already is able to handle traditional access points (subscriber or network interfaces) connected to STM circuit switches. In so doing, the PSTN/ISDN node 30 has logical representations of these existing access points in a static data structure of the PSTN/ISDN node 30. In accordance with the present invention, the PSTN/ISDN node 30 additionally handles access points connected to the ATM switch. In this regard, see (for example) interface 41 in FIG. 3 (hereinafter described). Thus, for the present invention the PSTN/ISDN node 30 has logical representations of these additional access points in its static data structure. Therefor, the bearer type data is employed in the prior discussion as a way of distinguishing the logical representation of the additional access points (e.g., ATM related access points) in the static data structure from the logical representation of the traditional access points.

It was also mentioned above that encapsulation of in-band information must be set up the same way in both ends. More specifically, a same type of cell filling must be employed by two circuit emulation devices which are corrected together. For example, if on a link connecting two circuit emulation devices an ATM cell is packed with only one voice sample by a first of the circuit emulation devices, the second of the circuit emulation devices must pack ATM cells in a similar manner.

In the above regard, filling only part of an ATM cell with information is a technique for reducing delays, although it may increase overhead. Another way of reducing delay is employment of the AAL2 protocol. As understood by those skilled in the art, AAL2 is a protocol layer on top of ATM, and allows transport of mini-cells within ATM cells. Usage of the smaller AAL2 cells helps address bandwidth and delay problems in the air interface. The present invention can be utilized with AAL2 switching as an alternative to ATM switching. If one implements AAL2 in the present invention, the switch 45 operates as an AAL2 switch and GPN/ATM translation table 49 in ATM node 40 must also include an AAL2 pointer. Whenever the ingress and egress point is referenced, it can alternately include an AAL2 pointer. Thus, as used herein and in the appended claims, ATM encompasses ATM-related protocols on top of ATM, such as AAL2.

Figure 2:
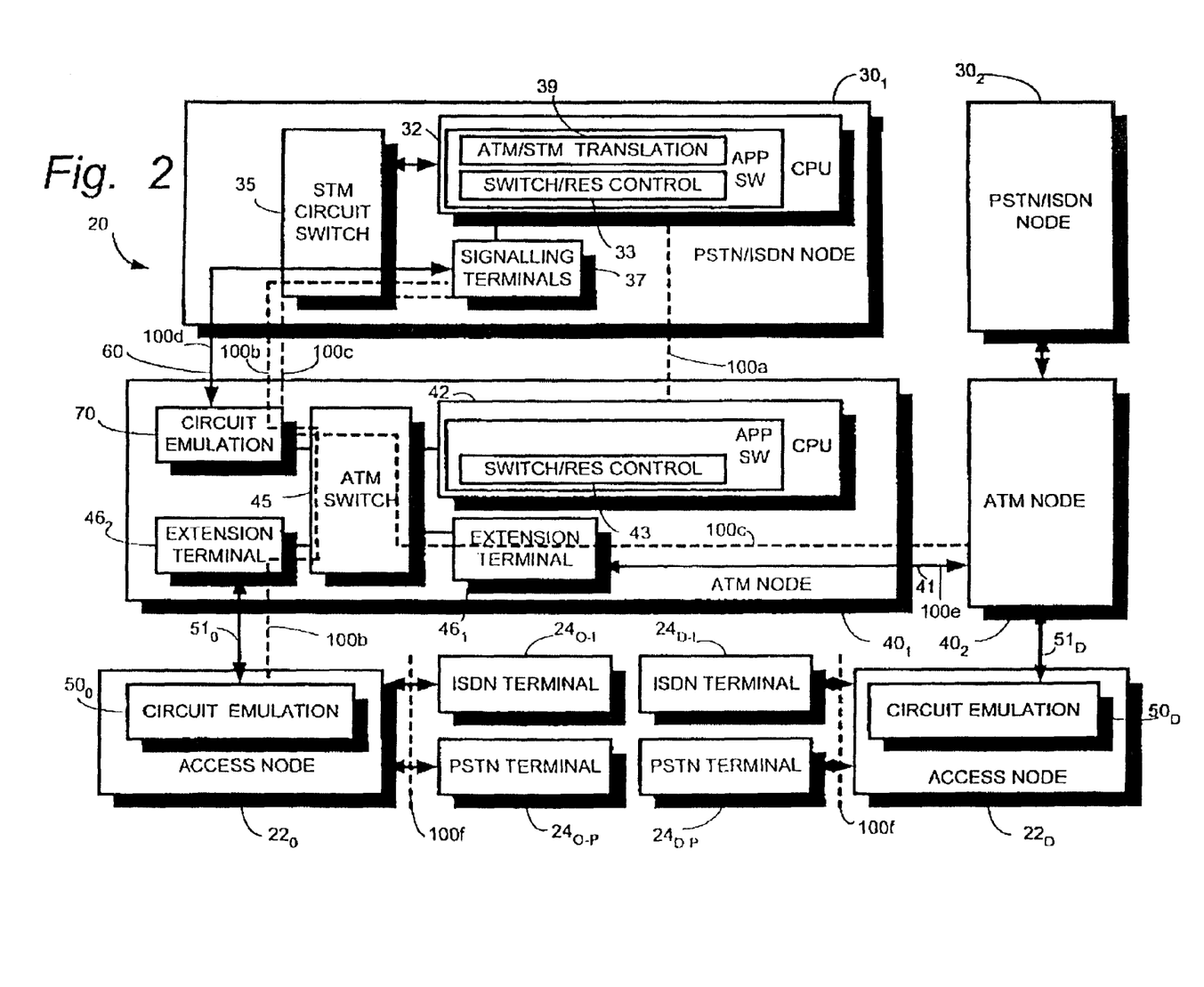
FIG. 2 is a schematic view of a hybrid STM/ATM network according to another embodiment of the invention.

FIG. 2 shows a hybrid STM/ATM network 20' according to another embodiment of the present invention. The embodiment of FIG. 2 primarily differs from the embodiment of FIG. 1 in that the embodiment of FIG. 2 does not employ global position numbers (GPNs). Rather, the embodiment of FIG. 2 uses a ATM/STM translation table 39' in processor 32 of PSTN/ISDN node 30$_1$ instead of an GPN/ATM translation table. In the embodiment of FIG. 2, the translation tables in the circuit emulation 50$_0$ translates the SETUP message from 64 kbps speech channel to an ATM address (VP and VC), in similar manner as occurs at event E-2 in the embodiment of FIG. 1 and FIG. 1A. After routing of the translated SETUP message through ATM switch 45, the circuit emulation 70 translates the SETUP message to the STM format as occurred at event E-5 of the embodiment of FIG. 1 and FIG. 1A. The embodiment of FIG. 2 differs from that of the embodiment of FIG. 1 and FIG. 1A in that processor 32 of PSTN/ISDN node 30 terminates the narrowband signaling by translating a narrowband reference point (e.g., b-channel if an IDSN connection) to a corresponding ATM address for use by ATM node 40. Thus, for the FIG. 2 embodiment, the switch control message of event E-11 sends the ATM VP/VC/port information understood by ATM node 40$_1$. Thus, the translation of event E-12 of the FIG. 1/FIG. 1A embodiment is unnecessary in the FIG. 2 embodiment. Rather, upon receiving the ATM VP/VC/port information in the switch control message of event E-11, the embodiment of FIG. 2 proceeds to the path set up and resource reservation operations denoted as event E-13.

The principles as illustrated in the embodiments hereof are also applicable to the carrying of other types of signaling messages in ATM cells. Included among such other types of signaling messages are those destined for the originating terminal, e.g., call completion signaling message, in which case some of the events described herein are performed essentially in reverse order.

Figure 3:
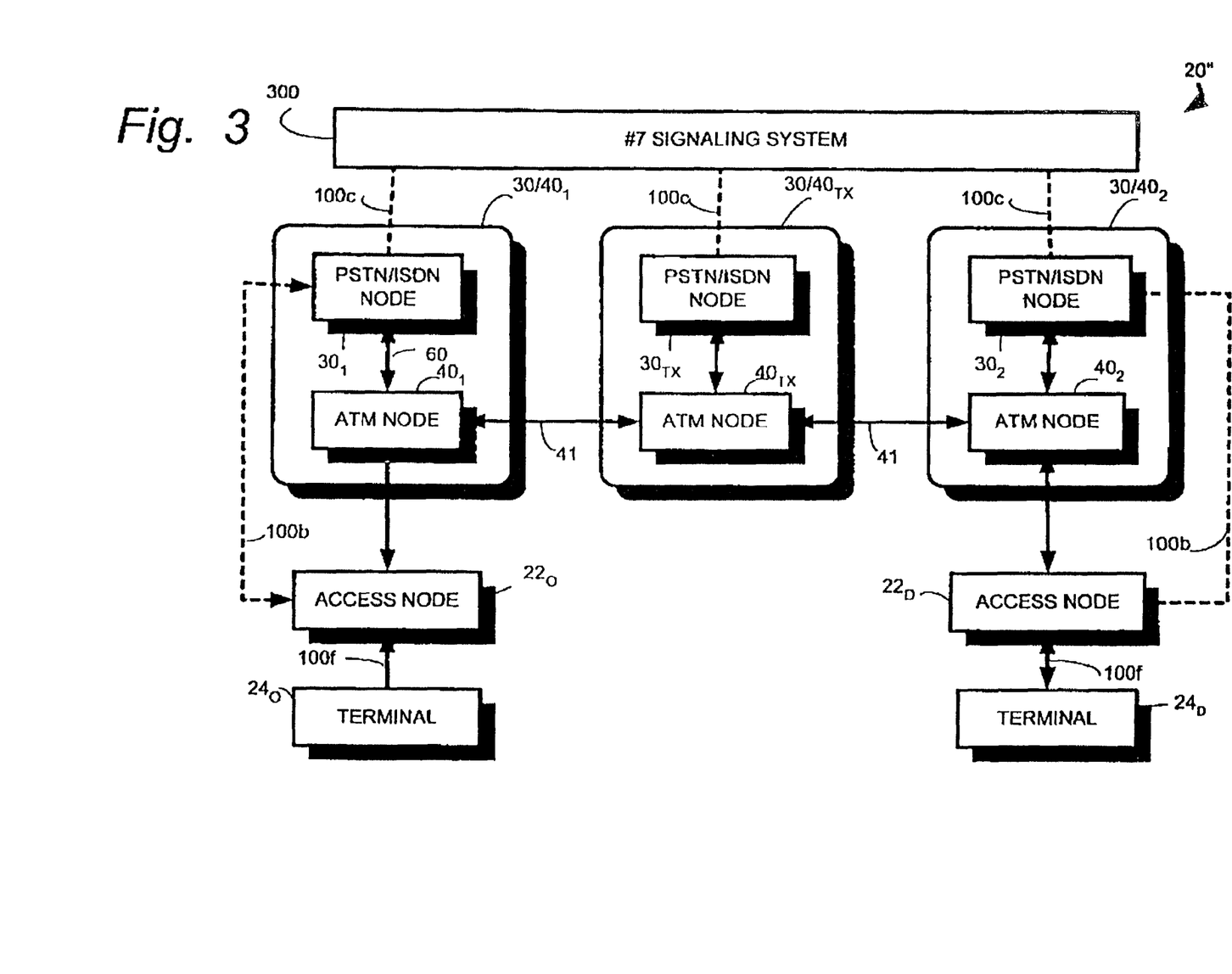
FIG. 3 is a schematic view showing a transit hybrid node pair of the invention connected between two local exchange hybrid node pairs of the invention.

FIG. 3 provides an illustration of how hybrid node pairs 30/40 of the invention can be arranged in an example hybrid STM/ATM network 20". Network 20" has three node pairs 30/40, including a transit exchange hybrid node pair 30/40$_{TX}$ between two local exchange hybrid node pairs 30/40$_1$ and 30/40$_2$. FIG. 3 shows provision of a #7 signaling system 300, which is a logical system carried in the ATM network on an ATM AAL layer as above described. As an alternate embodiment, the #7 signaling system could be provided with its own physical network.

Figure 4:
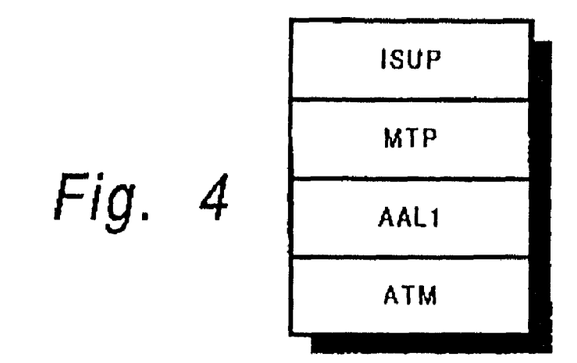
FIG. 4 is a diagrammatic view of an example protocol between two elements of the networks of the invention which include hybrid node pairs.

FIG. 4 is a diagrammatic view of an example protocol between two elements of the networks of the invention which include hybrid node pairs. The ATM node 40 with its ATM switch 45 terminates the ATM and AAL1 (circuit emulation part) layers; the PSTN/ISDN node 30 terminates the MTP and ISUP layers.

Figure 5A:
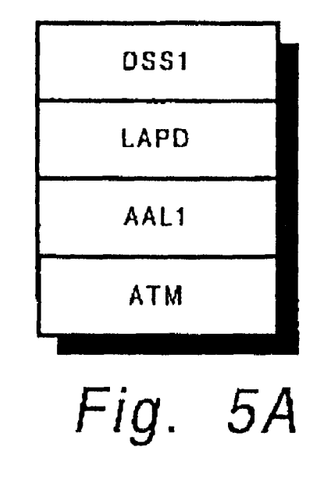
FIG. 5A–FIG. 5C is a diagrammatic views of alternate example protocols between two elements, a first of the network elements having a hybrid node pair of the invention and a second of the network elements being an access node with an additional ATM interface with circuit emulation.
Figure 5B:
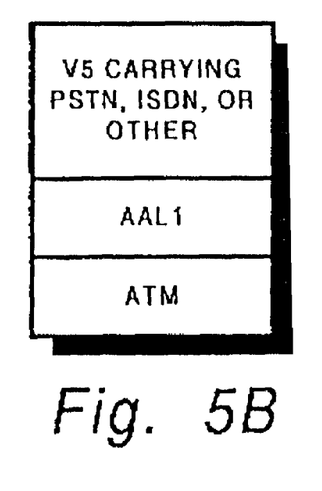
Figure 5C:
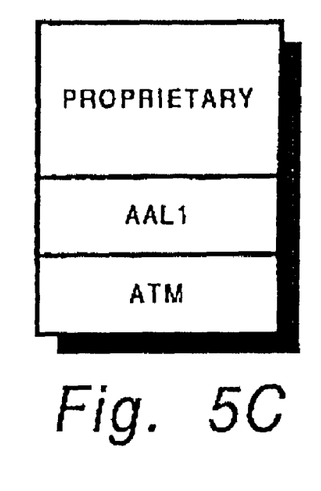

FIG. 5A–FIG. 5C is a diagrammatic views of alternate example protocols between two elements, a first of the network elements having a hybrid node pair of the invention and a second of the network elements being an access node with an additional ATM interface with circuit emulation. In the first network element, the ATM switch terminates the ATM and AAL1 (circuit emulation part) layers, while the layers above are terminated by the PSTN/ISDN node 30. In the second network element, the ATM interface and circuit emulation addition to the access node terminates the ATM and AAL1 layers, while the layers above are terminated by the connected terminal and the access node part. The example protocols of FIGS. 5A–5C can be used, or example, on the interface 100*b*.

Figure 6:
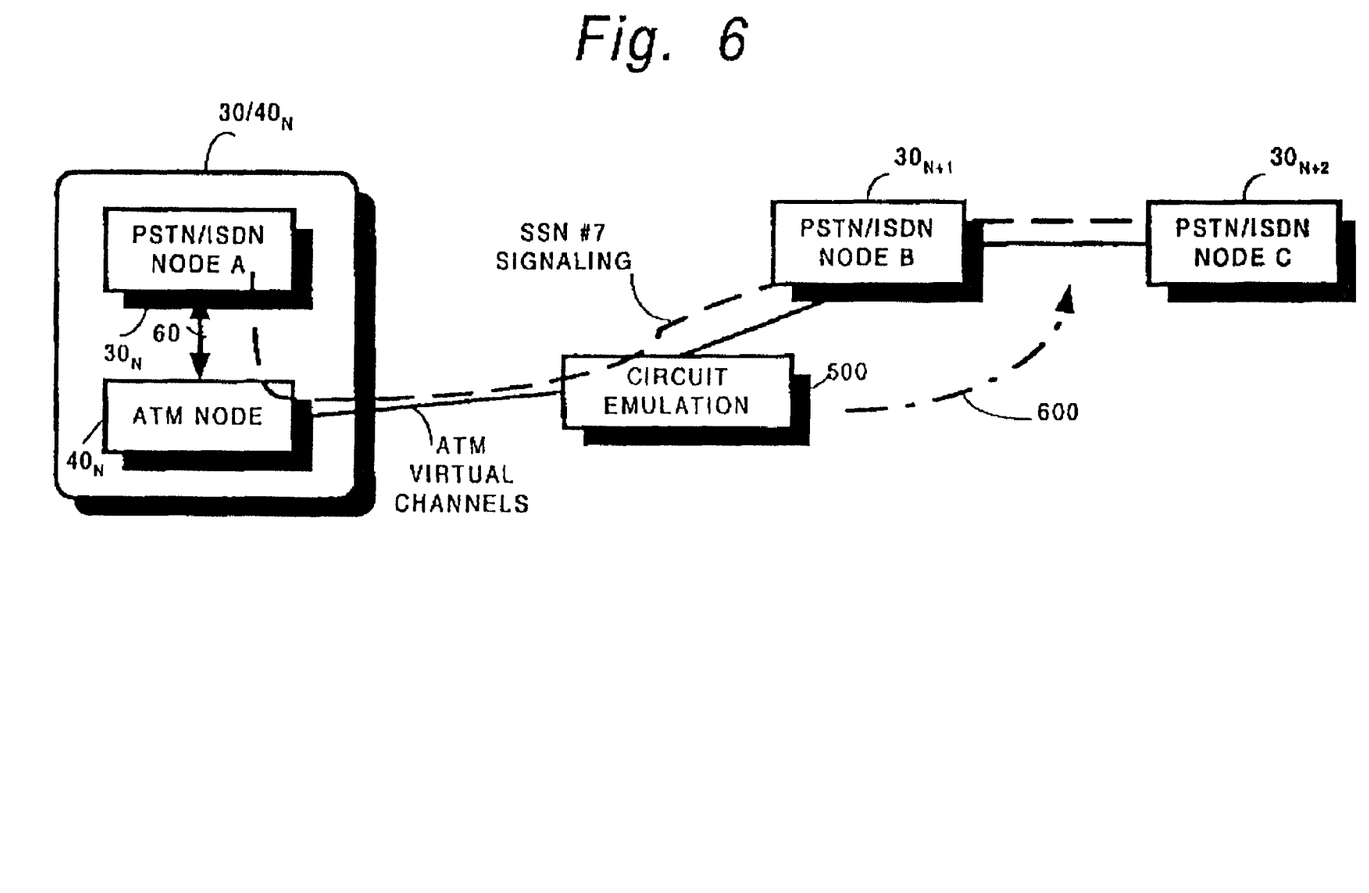
FIG. 6 is a diagrammatic view showing gradual upgrading of a network from a traditional narrowband STM transported and switched environment into the environment hybrid STM/ATM network of the present invention.

FIG. 6 shows gradual upgraded of a network from a traditional narrowband STM transported and switched environment into the environment (e.g., hybrid STM/ATM network 20) of the present invention. In FIG. 6, the circuit emulation equipment (translator) 500 separates the hybrid environment from the pure STM environment. If node B (PSTN/ISDN node 30$_{N+1}$) is upgraded with ATM switching and (signaling and traffic) transport according to the present invention, the node C (PSTN/ISDN node 30$_{N+2}$) is not disturbed if the circuit emulation equipment (translator) 500 is moved in between nodes B and C in the manner illustrated by the dotted-dashed line 600 as shown in FIG. 6.

Figure 7:
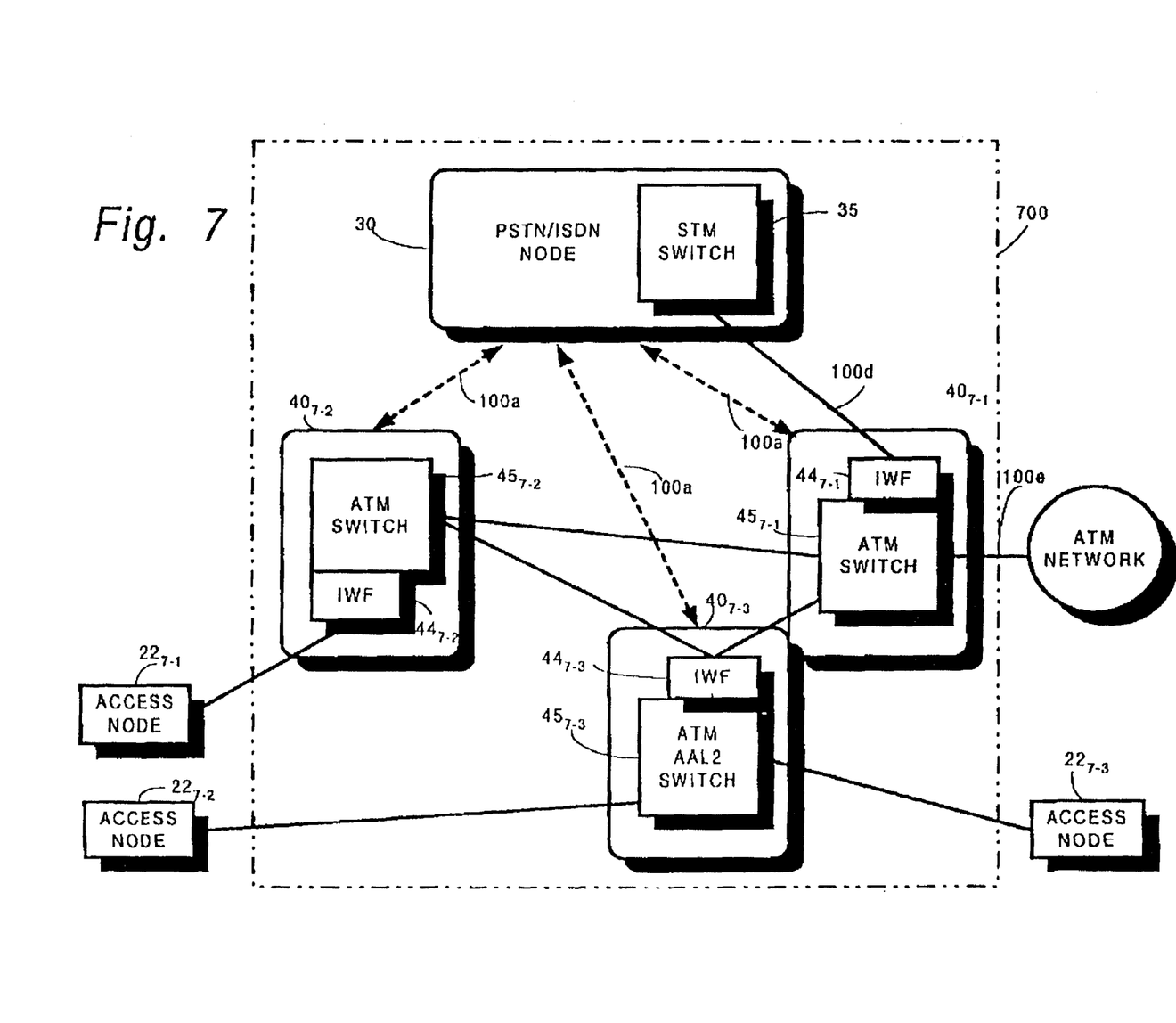
FIG. 7 is a schematic view showing a multi-switch hybrid node according to yet another embodiment of the invention.

As shown in FIG. 7, the present invention permits the possibility of one node including many switches, and switching logic within the node coordinates set up paths through the switches. This logic also inserts interworking functions (IWFs) between switches (if needed), and makes it possible to use resources independent on which switch they are allocated to. For example, the multi-switch node 700 of the present invention includes PSTN/ISDN node 30 with its STM switch 35, connected by interface 100*d* to ATM node 40$_{7-1}$. Specifically, connection is made through IWF 44$_{7-1}$ to ATM switch 45$_{7-1}$ of ATM node 40$_{7-1}$. The ATM switch 45$_{7-1}$ of ATM node 40$_{7-1}$ is connected by interface 100*e* to an ATM network, as well as to ATM node 40$_{7-2}$ and ATM node 40$_{7-3}$ included in the multi-switch node 700. The ATM node 40$_{7-2}$ has a is switch 45$_{7-2}$ and IWF 44$_{7-2}$ through which connection can be made with access node 22$_{7-2}$. The ATM node 40$_{7-3}$ has an ATM AAL2 switch 45$_{7-3}$, which connects to ATM nodes 40$_{7-1}$ and 40$_{7-2}$ through IWF 44$_{7-3}$ of ATM node 40$_{7-3}$. Access nodes 22$_{7-2}$ and 22$_{7-3}$ are connected to ATM AAL2 switch 45$_{7-3}$ of ATM node 40$_{7-3}$.

The present invention advantageously reuses PSTN and ISDN software in the PSTN/ISDN nodes 30 in a fairly simple way. That is, already-developed narrowband application software residing in the PSTN/ISDN nodes 30 can be utilized, while on-demand ATM connections are used as traffic bearers. The present invention thus allows a PSTN/ISDN node such as PSTN/ISDN node 30 to control the call, which facilitates use of well-proven software for various services and functions (e.g., subscriber services, intelligent network (IN) services, Centrex, Charging Customer Care systems, etc.).

ATM is thus used as a transport and switching mechanism in the present invention, while the signaling remains normal narrowband signaling. The narrowband signaling is transported on permanent paths over ATM connections, and the narrowband speech channels are transported on ATM, and switched on a "per call basis" (on-demand) through an ATM switch.

The narrowband application software executed by processor(s) 32 of PSTN/ISDN nodes 30 thus acts as if operating on its STM circuit switched transport, when in fact it is actually operating on an ATM cell switch. It should be understood that the ATM switch can reside in a separate ATM node, or be integrated in the same node as the STM switch. On a "per all basis" the switching logic in the PSTN/ISDN nodes 30 requests the switching logic in the ATM nodes 40 to be set up and disconnected through an ATM cell switch.

It should be understood that variations of the foregoing are within the scope of the present invention. For example, the circuit emulation 70 is shown, e.g., in FIG. 1 as being provided on a device board of ATM node 40. Alternatively, circuit emulation 70 may be located elsewhere, such as (for example) on link 60 between PSTN/ISDN node 30 and ATM node 40, or even included in PSTN/ISDN node 30 (e.g., at either end of interface 100*d*).

While various processors, such as processors 32 and 42, have been illustrated as single processors, it should be understood that the functionality of such processors can be situated or distributed in different ways, e.g., distributed over several processors to achieve, e.g., scalability in respect to processing capacity and reliability, for example.

In the foregoing examples, the SETUP message (received at the STM node in STM format) is routed through STM circuit switch 35 as indicated by event E-8 to signaling terminals 37. It should be understood, however, that depending upon implementation in an PSTN/ISDN node, signaling may take another way to reach a signaling terminal (e.g., other than through a switch).

The present invention also describes a system with one STM switch and one ATM switch associated with one another. This particular configuration is advantageous in that resources which take care of certain kinds of signals, e.g., in-band signals, can be situated in the STM switch and be used also for the ATM transported calls. This is also a way of reusing the installed base, if such exists.

Also, the present invention can perform switching on various levels, such as the AAL2 level and with mini-cells, which would tend to reduce any delay/echo problems.

The present invention thus pertains to the telecommunications world, at an attempt to introduce ATM to a telecommunications network. The present invention addresses the situation in which a circuit switched telephony network pre-exits, and is to be augmented or partially replaced by parts that employ ATM for transport and switching. The present invention does not employ broadband signaling, but rather narrowband signaling and the bearer part of the call follow each other to the same extent as in a traditional narrowband circuit switched network.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for combining narrowband and broadband transport mechanisms in a communications network, comprising the steps of:
   receiving, at a first node, a communication, the communication including data information and signaling information;
   sending, by the first node, the signaling information to a second node;
   processing, by the second node, the signaling information to produce at least one routing instruction;
   sending, by the second node, the at least one routing instruction to the first node;
   sending, by the first node, the data information to the second node responsive to the at least one routing instruction; and
   wherein the first node includes a broadband switching fabric and the second node includes a narrowband switching fabric and a switching intelligence.

2. The method according to claim 1, further comprising the step of:
   forwarding, by the second node, the communication to another node.

3. The method according to claim 1, wherein said step of sending, by the first node, the signaling information to a second node comprises the step of sending, by the first node, the signaling information to the second node over a first link, and wherein said step of sending, by the first node, the data information to the second node responsive to the at least one routing instruction comprises the step of sending, by the first node, the data information to the second node over a second link.

4. The method according to claim 1, wherein the first node relies on the switching intelligence of the second node by responding to routing instructions.

5. A system for combining narrowband and broadband transport mechanisms in a communications network, comprising:
   a first node, said first node including switching intelligence;
   a plurality of second nodes, each second node of said plurality of second nodes including broadband switching fabric;
   an interworking entity, said interworking entity operatively connectable to said first node and said plurality of second nodes, said interworking entity adapted to receive data in a first format from said first node, map the received data into a second format interpretable by said plurality of second nodes, and send the mapped data to at least one second node of said plurality of second nodes; and
   wherein said interworking entity Thereby enables said plurality of second nodes to be controlled, at least partially, by the switching intelligence of said first node.

6. The system according to claim 5, wherein said first node is comprised of a telecommunications node, said telecommunications node including narrowband switching fabric.

7. The system according to claim 5, wherein said interworking entity comprises a third node between said first node and said plurality of second nodes.

8. The system according to claim 5, wherein said interworking entity is at least one of part of and co-located with a second node of said plurality of second nodes.

9. The system according to claim 5, wherein said interworking entity is further adapted to emulate an interface for a synchronous transfer mode (STM)-based node with respect to said first node.

10. The system according to claim 5, wherein said plurality of second nodes comprise at least part of a broadband network.

11. The system according to claim 10, wherein each second node of said plurality of second nodes is adapted to communicate signaling information and data information over the broadband network and to convert broadband information into another media type.

12. The system according to claim 10, wherein the mapped data comprises instructions for the at least one second node to establish a communication path through at least a portion of the broadband network.

13. The system according to claim 5, wherein the received data comprises at least one first network address, and the mapped data comprises at least one second network address.

14. The system according to claim 13, wherein the at least one first network address comprises at least one trunk connection.

15. The system according to claim 13, wherein the at least one second network address comprises at least one asynchmnous transfer mode (ATM) identifier.

* * * * *

UNITED STATES PATENT AND TRADEMARK OFFICE
CERTIFICATE OF CORRECTION

PATENT NO. : 7,054,305 B2
APPLICATION NO. : 09/866135
DATED : May 30, 2006
INVENTOR(S) : Furtenback et al.

It is certified that error appears in the above-identified patent and that said Letters Patent is hereby corrected as shown below:

In Fig 2, Sheet 3 of 7, delete Tag "20" and insert -- 20' --, therefor.

In Fig 2, Sheet 3 of 7, delete Tag "39" and insert Tag -- 39' --, therefor.

Column 9, Line 52, delete "filer" and insert -- further --, therefor.

Column 11, Line 7, delete "corrected" and insert -- connected --, therefor.

Column 16, Lines 12-13, in Claim 15, delete "asynchmnous" and insert -- asynchronous --, therefor.

Signed and Sealed this

Eighteenth Day of December, 2007

JON W. DUDAS
*Director of the United States Patent and Trademark Office*